United States Patent
Zhang

(10) Patent No.: US 12,531,733 B2
(45) Date of Patent: Jan. 20, 2026

(54) INFORMATION TRANSMISSION METHOD, STORAGE MEDIUM AND ELECTRONIC DEVICE

(71) Applicant: Beijing Roborock Technology Co., Ltd., Beijing (CN)

(72) Inventor: Lei Zhang, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 177 days.

(21) Appl. No.: 18/286,178

(22) PCT Filed: Mar. 8, 2022

(86) PCT No.: PCT/CN2022/079793
§ 371 (c)(1),
(2) Date: Oct. 9, 2023

(87) PCT Pub. No.: WO2022/213760
PCT Pub. Date: Oct. 13, 2022

(65) Prior Publication Data
US 2024/0205005 A1 Jun. 20, 2024

(30) Foreign Application Priority Data
Apr. 9, 2021 (CN) .......................... 202110383378.4

(51) Int. Cl.
*H04L 9/14* (2006.01)
(52) U.S. Cl.
CPC ...................... *H04L 9/14* (2013.01)
(58) Field of Classification Search
CPC ..... H04L 9/14; H04L 63/0861; H04L 63/123; H04L 63/126; H04L 63/083; H04L 63/0442
See application file for complete search history.

(56) References Cited

U.S. PATENT DOCUMENTS

2017/0208049 A1 7/2017 Hu
2018/0206117 A1* 7/2018 Stahl ..................... H04W 12/35
(Continued)

FOREIGN PATENT DOCUMENTS

| CN | 106850664 A | 6/2017 |
|---|---|---|
| CN | 110519760 A | 11/2019 |

(Continued)

OTHER PUBLICATIONS

International Search Report (with partial translation) and Written Opinion dated May 27, 2022, issued in corresponding International Patent Application No. PCT/CN2022/079793.

(Continued)

*Primary Examiner* — Abiy Getachew

(74) *Attorney, Agent, or Firm* — Morgan, Lewis & Bockius LLP

(57) ABSTRACT

An information transmission method is applied to a mobile terminal and includes: during a process of performing network access configuration on an intelligent device, sending a public key to the intelligent device, and saving a corresponding private key, wherein the public key and the private key are a pair of asymmetric keys, which are generated in advance by a mobile terminal; after a command to be sent is signed by using the private key, sending, to the intelligent device, commands before and after the signing; and after encrypted information sent by the intelligent device is received, decrypting same by using the private key.

18 Claims, 2 Drawing Sheets

(56) References Cited

U.S. PATENT DOCUMENTS

2019/0332774 A1* 10/2019 Nix .................. G06F 21/57
2022/0070172 A1* 3/2022 Muthusamy .......... H04L 63/108

FOREIGN PATENT DOCUMENTS

| CN | 110881019 A | 3/2020 |
| CN | 110943976 A | 3/2020 |
| CN | 111541534 A | 8/2020 |
| CN | 111918283 A | 11/2020 |
| CN | 113114668 A | 7/2021 |
| IN | 106302415 A | 1/2017 |

OTHER PUBLICATIONS

First Office Action dated Apr. 13, 2022, issued in corresponding Chinese Patent Application No. 202110383378.4.
Notice of Allowance dated Jul. 21, 2023, issued in corresponding Chinese Patent Application No. 202110383378.4.
Extended European Search Report issued in corresponding European Patent Application No. 22783829.9, dated Mar. 5, 2025.

\* cited by examiner

Sending a public key to a smart device in a process of network access configuration of the smart device, and saving a corresponding private key

↓

Upon signing a command to be sent with the private key, sending the signed command and an unsigned command together to the smart device

↓

Upon receiving encrypted information sent from the smart device, decrypting the encrypted information with the public key

FIG. 1

Receiving a network access configuration instruction, and activating network access configuration in response to the network access configuration instruction

↓

Saving a received public key in a process of the network access configuration

↓

Upon receiving a singed command and an unsigned command sent by a mobile terminal, verifying a signature of the signed command with the public key

↓

Comparing the signature-verified command with the unsigned command, and executing the command if the two commands are consistent

FIG. 2

INFORMATION TRANSMISSION METHOD, STORAGE MEDIUM AND ELECTRONIC DEVICE

CROSS-REFERENCE TO RELATED APPLICATION

This application is a US national phase of PCT international application No. PCT/CN2022/079793 filed on Mar. 8, 2022, which claims priority of the Chinese Patent Application No. 202110383378.4, filed on Apr. 9, 2021, which is incorporated herein by reference in its entirety.

TECHNICAL FIELD

The present disclosure relates to the technical field of transmission of information of cleaning devices, and in particular, to an information transmission method, a storage medium and an electronic device.

BACKGROUND ART

At present, information sent by two devices that need to communicate with each other is encrypted and then transmitted through a server in the field of the Internet of Things (IoT). For example, an encrypted instruction sent from an application program side is sent to an IoT device via the server, and then the IoT device receives the encrypted instruction, obtains the instruction by decryption and executes the instruction from the application program side. However, lawbreakers may intercept sensitive information transmitted by the server, steal keys for encryption and decryption from the server at the same time, and perform decryption with the keys, which is undesired for protecting the privacy of users. Therefore, it is required to develop an information transmission method, a storage medium, and an IoT device.

SUMMARY OF THE INVENTION (I) Purpose of the Invention

The purpose of the present disclosure is to provide a secure information transmission method, a storage medium and an electronic device capable of ensuring user information.

(II) Technical Solutions

In order to solve the above problems, a first aspect of embodiments of the present disclosure provides an information transmission method, which is applied to a mobile terminal side. The information transmission method includes: sending a public key to a smart device in a process of network access configuration of the smart device, and saving a corresponding private key, wherein the public key and the private key are a pair of asymmetric keys and are generated in advance by the mobile terminal; upon signing a command to be sent with the private key, sending the signed command and an unsigned command together to the smart device; and upon receiving encrypted information sent from the smart device, decrypting the encrypted information with the public key.

Optionally, the information transmission method further includes: generating first information based on received authenticated login verification information; obtaining a first ciphertext by encrypting the private key with the first information; and sending the first ciphertext, so that the first ciphertext is saved to a server.

Optionally, the login verification information includes login password information input by a user, and generating first information based on received authenticated login verification information specifically includes: verifying a login password input by the user; and generating the first information by a hash calculation on the login password information if the verifying is successful.

Optionally, the information transmission method further includes: regenerating the first information based on the received authenticated login verification information when it is determined that the private key does not exist; requesting the server for acquiring the first ciphertext, and obtaining the private key by decrypting the first ciphertext with the regenerated first information; and saving the private key.

Optionally, the information transmission method further includes: upon receiving an instruction for resetting the login verification information, generating second information based on reset authenticated login verification information; obtaining a second ciphertext by encrypting the locally stored private key with the second information; and sending the second ciphertext, so that the second ciphertext is saved to the server instead of the first ciphertext.

Optionally, the information transmission method further includes: upon receiving an instruction for resetting the login verification information, generating second information based on reset authenticated login verification information; requesting the server for acquiring the first ciphertext; generating the first information based on the authenticated login verification information before the resetting; obtaining the private key by decrypting the first ciphertext with the regenerated first information; generating second information based on the reset authenticated login verification information; obtaining a second ciphertext by encrypting the private key, obtained by decrypting the first ciphertext, with the second information; and sending the second ciphertext, so that the second ciphertext is saved to the server instead of the first ciphertext.

A second aspect of the embodiments of the present disclosure provides an information transmission method, which is applied to a smart device side. The information transmission method includes: receiving a network access configuration instruction, and activating network access configuration in response to the network access configuration instruction; saving a received public key in a process of the network access configuration; upon receiving a singed command and an unsigned command sent by a mobile terminal, verifying a signature of the signed command with the public key; and comparing the signature-verified command with the unsigned command, and executing the command if the two commands are consistent.

Optionally, the information transmission method further includes: upon encrypting information to be sent with the public key, sending the information to the mobile terminal.

A third aspect of the embodiments of the present disclosure provides a mobile terminal. The mobile terminal includes: a sending module, configured to send a public key to a smart device in a process of network access configuration of the smart device, and further configured to send, upon signing a command to be sent with a corresponding private key, the signed command and an unsigned command together to the smart device; a saving module, configured to save the corresponding private key, wherein the public key and the private key are a pair of asymmetric keys and are generated in advance by the mobile terminal; and a decrypting module, configured to decrypt encrypted information, received from the smart device, with the public key.

Optionally, the mobile terminal further includes: a first ciphertext module, configured to generate first information based on received authenticated login verification information, and to obtain a first ciphertext by encrypting the private key with the first information, wherein the sending module is further configured to send the first ciphertext, so that the first ciphertext is saved to a server.

Optionally, the login verification information includes login password information input by a user, and the first ciphertext module includes: a verifying module, configured for verifying a login password input by the user; and a first information module, configured to generate the first information by a hash calculation on the login password information if verifying of the login password is successful.

Optionally, the first ciphertext module is further configured to regenerate the first information based on the received authenticated login verification information when it is determined that the private key does not exist; the first ciphertext module is further configured to request the server for acquiring the first ciphertext, and to obtain the private key by decrypting the first ciphertext with the regenerated first information; and the saving module is further configured to save the private key obtained by decrypting the first ciphertext.

Optionally, the mobile terminal further includes: a second ciphertext module, configured to generate, upon receiving an instruction for resetting the login verification information, second information based on reset authenticated login verification information, and configured to obtain a second ciphertext by encrypting the locally stored private key with the second information, wherein the sending module is further configured to send the second ciphertext, so that the second ciphertext is saved to the server instead of the first ciphertext.

Optionally, the mobile terminal further includes: a second ciphertext module, configured to generate, upon receiving an instruction for resetting the login verification information, second information based on reset authenticated login verification information, wherein the first ciphertext module is further configured to request the server for acquiring the first ciphertext, to generate the first information based on the authenticated login verification information before the resetting, and to obtain the private key by decrypting the first ciphertext with the regenerated first information; the second ciphertext module is further configured to generate second information based on the reset authenticated login verification information, and to obtain a second ciphertext by encrypting the private key, obtained by decrypting the first ciphertext, with the second information; and the sending module is further configured to send the second ciphertext, so that the second ciphertext is saved to the server instead of the first ciphertext.

A fourth aspect of the embodiments of the present disclosure provides an Internet of Things (IoT) device. The IoT device includes: a network access configuration module, configured to receive a network access configuration instruction, and to activate network access configuration in response to the network access configuration instruction; a saving module, configured to save a received public key in a process of the network access configuration; a signature verifying module, configured to verify, upon receiving a singed command and an unsigned command sent by a mobile terminal, a signature of the signed command with the public key; and a comparing module, configured to compare the signature-verified command with the unsigned command, and to execute the command if the two commands are consistent.

Optionally, the IoT device further includes: an encrypting module, configured to encrypt information to be sent with the public key: and a sending module, configured to send the encrypted public key to the mobile terminal.

A fifth aspect of the embodiments of the present disclosure provides a storage medium. On the storage medium, an application program is stored, wherein the application program, when executed by a processor, causes implementation of any one of the information transmission methods according to the first aspect of the embodiments of the present disclosure.

A sixth aspect of the embodiments of the present disclosure provides a storage medium. On the storage medium, an application program is stored, wherein the application program, when executed by a processor, causes implementation of any one of the information transmission methods according to the second aspect of the embodiments of the present disclosure.

A seventh aspect of the embodiments of the present disclosure provides an electronic device. The electronic device includes a memory, a processor, and a computer program stored on the memory and operable on the processor, wherein the computer program, when executed by the processor, causes implementation of any one of the information transmission methods according to the first aspect of the embodiments of the present disclosure.

An eighth aspect of the embodiments of the present disclosure provides an electronic device. The electronic device includes a memory, a processor, and a computer program stored on the memory and operable on the processor, wherein the computer program, when executed by the processor, causes implementation of any one of the information transmission methods according to the second aspect of the embodiments of the present disclosure.

(3) Beneficial Effects

The above technical solutions of the present disclosure have the following beneficial technical effects.

The application program sends the generated keys for encryption and decryption to the smart IoT device, wherein the opportunity of the initial point-to-point communication between the IoT device and the application program is utilized to send the keys to the smart IoT device. Since the key is transmitted in the process of the network access configuration of the IoT device, the transmitted key will not be received by the server, that is, the key for decrypting the ciphertext cannot be acquired at the server side. This method can meet the requirement of the encrypted transmission of information between IoT devices and user APPs, which can prevent device operators, network operators, and IoT platforms from acquiring original information in the encrypted transmission, thereby ensuring that user information will not be intercepted from the server side, and ensuring the security of user information.

BRIEF DESCRIPTION OF THE DRAWINGS

FIG. 1 is a schematic flowchart of an information transmission method according to a first embodiment of the present disclosure:

FIG. 2 is a schematic flowchart of an information transmission method according to a second embodiment of the present disclosure:

DETAILED DESCRIPTION

Figure 3:
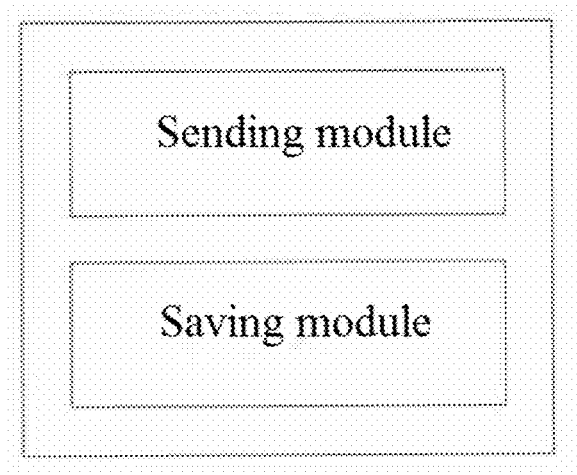
FIG. 3 is a schematic structural diagram of a mobile terminal according to a third embodiment of the present disclosure.

In order to make the purpose, technical solutions and advantages of the present disclosure clearer, the present disclosure will be further described in detail below in conjunction with specific embodiments and with reference to the accompanying drawings. It should be understood that these descriptions are exemplary only, and are not intended to limit the scope of the present disclosure. Further, in the following description, descriptions of well-known structures and techniques are omitted to avoid unnecessarily obscuring the concept of the present disclosure.

The terms "first", "second" and the like in the description and claims of the present disclosure and the above-mentioned accompanying drawings are used to distinguish different objects, rather than to describe a specific order. Furthermore, the terms "include" and "have", as well as any variations thereof, are intended to cover a non-exclusive inclusion. For example, a process, method, system, product or device including a series of steps or units is not limited to the listed steps or units, but optionally may also include steps or units not listed, or optionally may further include other steps or units inherent in these processes, methods, products or devices.

Reference herein to "embodiment" means that a particular feature, structure, or characteristic described in combination with the embodiment can be included in at least one embodiment of the present disclosure. This word appearing in various places in the description does not necessarily always refer to the same embodiment, nor refer to separate or alternative embodiments mutually exclusive of other embodiments. It is understood explicitly and implicitly by those skilled in the art that the embodiments described herein can be combined with other embodiments.

Apparently, the described embodiments are some of the embodiments of the present disclosure, but not all of them. Based on the embodiments in the present disclosure, all other embodiments obtained by persons of ordinary skill in the art without making creative efforts shall fall within the protection scope of the present disclosure. In addition, the technical features involved in different embodiments of the present disclosure described below may be combined with each other as long as there is no conflict therebetween. Hereinafter, the present disclosure will be described in more detail with reference to the accompanying drawings.

FIG. 1 is a schematic flowchart of an information transmission method according to a first embodiment of the present disclosure.

In the first embodiment of the present disclosure, as shown in FIG. 1, an information transmission method is provided. This information transmission method is applied to a mobile terminal side, and mainly includes: sending a public key to a smart device in a process of network access configuration of the smart device, and saving a corresponding private key, wherein the public key and the private key are a pair of asymmetric keys and are generated in advance by the mobile terminal; upon signing a command to be sent with the private key, sending the signed command and an unsigned command together to the smart device; and upon receiving encrypted information sent from the smart device, decrypting the encrypted information with the public key.

Specifically, an application program (for example, APP) of the mobile terminal generates a private key and a public key, and the public key and the private key are a pair of asymmetric keys. The application program sends a network access configuration instruction to the smart device, so as to activate network access configuration of the smart device. The network access configuration may be implemented by the Easy-Connect network distribution. Here, the network access configuration is performed in a stage of the initial point-to-point communication between the smart device and the application program of the mobile terminal, and the key used for encryption and decryption is transmitted in this stage and will not be acquired from the server side. Therefore, in a process of the network access configuration, the application program may send the public key to the smart device via a local area network; and the smart device saves the public key, and the application program saves the private key, so as to save the keys on a control side and an execution side, respectively. The mobile terminal side signs a command to be sent with the private key, and then, sends the signed command and an unsigned command together to the smart device. Upon receiving the encrypted information sent by the mobile terminal side, the smart device verifies a signature of the signed command with the public key to obtain a signature-verified command and compares the signature-verified command with the unsigned command, and if the comparison result is that the two commands are consistent, the smart device executes the received command. Herein, the private key and the public key generated by the application program may be generated before the application program sends the network access configuration instruction to the smart device, and may also be generated in the process of the network access configuration: the duration for which the application program keeps the private key is not limited. The smart device is a smart device that needs the network access configuration, and includes at least a smart home product and a drone product.

In some embodiments, the information transmission method further includes: generating first information based on received authenticated login verification information; obtaining a first ciphertext by encrypting the private key with the first information; and sending the first ciphertext, so that the first ciphertext is saved to a server.

Specifically, before the application program sends the network access configuration instruction, a user is required to perform a login operation. A login verification operation includes but is not limited to face recognition verification, fingerprint recognition verification, voiceprint recognition verification, third-party login verification, password login verification and verification code verification. No matter which verification operation is used, numerical information related to the login verification operation can be acquired directly or indirectly, and a hash calculation is performed on the numerical information to obtain a hash value of a preset length. The hash value is used as the first information and used as a key for encrypting the private key to obtain the first ciphertext which is sent by the mobile terminal to the server. The server saves the first ciphertext to back up the private key. Although the server saves the private key, it is saved in the form of ciphertext which needs to be decrypted with the first information, otherwise it is impossible to obtain the private key from the server by decryption.

In some embodiments, the login verification information includes login password information input by the user Generating first information based on received authenticated login verification information includes: verifying a login password input by the user: and generating the first information by a hash calculation on the login password information if the verifying is successful.

In an exemplary embodiment, the password input by the user to log in is 123456, and the password passes the login verification by the application program. The password is hashed to obtain a 9-digit hash value: jnbhuygv, which is used as a key for encrypting the private key. Hash calculation is used to make it difficult to deduce a plaintext with the first information, thereby ensuring the security of the key.

In some embodiments, the information transmission method further includes: regenerating the first information based on the received authenticated login verification information when it is determined that the private key does not exist; requesting the server for acquiring the first ciphertext, and obtaining the private key by decrypting the first ciphertext with the regenerated first information; and saving the private key.

Specifically, when the cache for the user's application program is emptied, the application program is uninstalled or the user changes a mobile phone, the private key stored in the mobile terminal will be cleared off, and the application program cannot detect the key. In this case, the user needs to perform an account login operation and input a correct password. After the input correct password passes the verification by the application program, a hash calculation is performed to obtain the hash value in the foregoing embodiment. The application program downloads a backup file (namely, the first ciphertext) of the user's corresponding device from the server, and acquires the private key by decrypting the first ciphertext using a symmetric encryption algorithm with the hash value as a key; and the acquired private kay is stored in the application program. The time for downloading the first ciphertext from the server is not limited, that is, the first ciphertext may be downloaded before the hash value is obtained, or the first ciphertext may be downloaded after the hash value is obtained.

In some embodiments, the information transmission method further includes: upon receiving an instruction for resetting the login verification information, generating second information based on reset authenticated login verification information; obtaining a second ciphertext by encrypting the locally stored private key with the second information; and sending the second ciphertext, so that the second ciphertext is saved to the server instead of the first ciphertext.

Specifically, the user inputs a new password, and a corresponding new hash value (namely, the second information) is generated based on the new password. The private key is encrypted with the newly generated hash value as a symmetric encryption key to obtain a backup ciphertext, i.e., the second ciphertext, which is uploaded to the server and replaces the first ciphertext.

In some embodiments, the information transmission method further includes: upon receiving an instruction for resetting the login verification information, generating second information based on the reset authenticated login verification information; requesting the server for acquiring the first ciphertext; generating the first information based on the authenticated login verification information before the resetting; obtaining the private key by decrypting the first ciphertext with the regenerated first information; generating second information based on the reset authenticated login verification information; obtaining a second ciphertext by encrypting the private key, obtained by decrypting the first ciphertext, with the second information; and sending the second ciphertext, so that the second ciphertext is saved to the server instead of the first ciphertext.

Specifically, when the user resets the password, the application program downloads backup ciphertexts (namely, the first ciphertext) of all devices of the user from the server. Before resetting the password, the user needs to input the previous password for verification. After the previous password passes the verification, the application program performs a hash calculation again on the previous password to obtain the aforementioned hash value, and this hash value is used to decrypt all of the backup ciphertexts using a symmetric encryption algorithm to obtain the private key. The user then input a new password, and a hash value (namely, the second information) corresponding to the new password is generated in the same manner. The private key is encrypted with the newly generated hash value as a symmetric encryption key to obtain a backup ciphertext, i.e., the second ciphertext, which is uploaded to the server and replaces the first ciphertext.

In some embodiments, the first information and the second information are used to encrypt the key using a symmetric encryption algorithm. Symmetric encryption algorithms at least include DES algorithm, 3DES algorithm, TDEA algorithm, Blowfish algorithm, RC5 algorithm, and IDEA algorithm. There is no restriction on which symmetric encryption algorithm is used for encryption of the private key.

FIG. 2 is a schematic flowchart of an information transmission method according to a second embodiment of the present disclosure.

In the second embodiment of the present disclosure, as shown in FIG. 2, an information transmission method is provided. The information transmission method is applied to a smart device side, and mainly includes: receiving a network access configuration instruction, and activating network access configuration in response to the network access configuration instruction; saving a received public key in a process of the network access configuration; upon receiving a singed command and an unsigned command sent from a mobile terminal, verifying a signature of the signed command with the public key; and comparing the signature-verified command with the unsigned command, and executing the command if the two commands are consistent.

Specifically, the smart device receives the network access configuration instruction sent from the mobile terminal side, that is, the network access configuration instruction sent by the application program, and then connects to the application program for network access configuration. The network access configuration may be implemented by the Easy-Connect network distribution. Here, the network access configuration is performed in a stage of the initial point-to-point communication between the smart device and the application program of the mobile terminal, and the key used for encryption and decryption is transmitted in this stage and will not be acquired from the server. In this connection process, the smart device receives and saves the public key sent by the application program, and the application program saves the private key, so as to save the keys on a control side and an execution side, respectively. The smart device receives the signed command and the unsigned command together, verifies a signature of the signed command with the saved public key to obtain a signature-verified command, and compares the signature-verified command with the unsigned command. If the comparison result is that the two commands are consistent, the smart device executes the received command. The smart device is a smart device that needs the network access configuration, and includes at least a smart home product and a drone product.

The signature-verified command is compared with the unsigned command and the command is executed if the two commands are consistent, which can prevent lawbreakers from altering the command in the transmission of the command, or even acquiring sensitive information of users by inserting viruses.

In some embodiments, the information transmission method further includes: upon encrypting information to be sent with the public key, sending the information to the mobile terminal.

Specifically, the smart device encrypts the information to be sent with the public key, and sends the encrypted information to the mobile terminal, so as to realize information transmission. Upon receiving the information sent by the smart device, the mobile terminal decrypts the information sent by the smart device with a pre-stored private key to obtain the decrypted information.

In a specific embodiment, the user logs in a mobile APP named "Home Steward", and inputs a login password. After the login password passes the verification of the mobile APP, the mobile APP performs a hash calculation on the login password to obtain a hash value, and stores it in the APP.

The mobile APP generates a pair of asymmetric keys (a public key and a private key). In a process of network access configuration, the mobile APP sends the public key to a smart sweeping robot via a TLS (Transport Layer Security) secure transmission channel of a local area network, and the smart sweeping robot receives and locally stores the public key while the mobile APP locally stores the private key.

The mobile APP encrypts the private key using AES (symmetric encryption algorithm) with the aforementioned hash value as a key to obtain a backup ciphertext, and uploads the backup ciphertext to the server for saving.

The user issues a regular cleaning command to the smart sweeping robot. Before sending the command to the smart sweeping robot, the mobile APP signs the regular cleaning command with the private key, and sends the signed command and an unsigned command together to the smart sweeping robot via an IoT transmission channel. Upon receiving the signed command and the unsigned command, the smart sweeping robot verifies a signature of the signed command with the public key to obtain a result of the verification and compares it with the unsigned command. If the signature verification fails or a comparison result is inconsistent, the smart sweeping robot will not execute the regular cleaning command; and if the comparison result is consistent, it will execute the regular cleaning command.

After the smart sweeping robot completes the regular cleaning command, it sends a message of completion of the command to the mobile APP authorized by the user. The smart sweeping robot asymmetrically encrypts the message of completion of the command with the public key to obtain a ciphertext of the message, and sends the ciphertext of the message to the mobile APP via the IoT transmission channel. Upon receiving the ciphertext of the message, the mobile APP decrypts it with the saved private key to obtain the original text of the message, and displays it to the user, or reminds the user to view the original text of the message.

FIG. 3 is a schematic structural diagram of a mobile terminal according to a third embodiment of the present disclosure.

In the third embodiment of the present disclosure, as shown in FIG. 3, a mobile terminal is provided, and mainly includes a sending module, a saving module and a decrypting module. The sending module is configured to send a public key to a smart device in a process of network access configuration of the smart device, and is further configured to send, upon signing a command to be sent with a corresponding private key, the signed command and an unsigned command together to the smart device. The saving module is configured to save the private key, wherein the public key and the private key are a pair of asymmetric keys and are generated in advance by the mobile terminal. The decrypting module is configured to decrypt encrypted information, received from the smart device, with the public key.

In some embodiments, the mobile terminal further includes a first ciphertext module. The first ciphertext module is configured to generate first information based on received authenticated login verification information, and to obtain a first ciphertext by encrypting the private key with the first information. The sending module is further configured to send the first ciphertext, so that the first ciphertext is saved to a server.

In some embodiments, the login verification information includes login password information input by a user, and the first ciphertext module includes a verifying module and a first information module. The verifying module is configured for verifying a login password input by the user. The first information module is configured to generate the first information by a hash calculation on the login password information if the login password verification is successful.

In some embodiments, the mobile terminal further includes a first encrypting module. The first ciphertext module is configured to regenerate the first information based on the received authenticated login verification information when it is determined that the private key does not exist; the first ciphertext module is further configured to request the server for acquiring the first ciphertext, and to obtain the private key by decrypting the first ciphertext with the regenerated first information; and the saving module is configured to save the private key obtained by decrypting the first ciphertext.

In some embodiments, the mobile terminal further includes a second ciphertext module. The second ciphertext module is configured to generate, upon receiving an instruction for resetting the login verification information, second information based on reset authenticated login verification information, and is configured to obtain a second ciphertext by encrypting the locally stored private key with the second information; and the sending module is further configured to send the second ciphertext, so that the second ciphertext is saved to the server instead of the first ciphertext.

In some embodiments, the mobile terminal further includes a second ciphertext module. The second ciphertext module is configured to generate, upon receiving an instruction for resetting the login verification information, second information based on reset authenticated login verification information. The first ciphertext module is configured to request the server for acquiring the first ciphertext, to generate the first information based on the authenticated login verification information before reset, and to obtain the private key by decrypting the first ciphertext with the regenerated first information. The second ciphertext module is configured to generate second information based on the reset authenticated login verification information, and to obtain a second ciphertext by encrypting the private key, obtained by decrypting the first ciphertext, with the second information. The sending module is further configured to send the second ciphertext, so that the second ciphertext is saved to the server instead of the first ciphertext.

Figure 4:
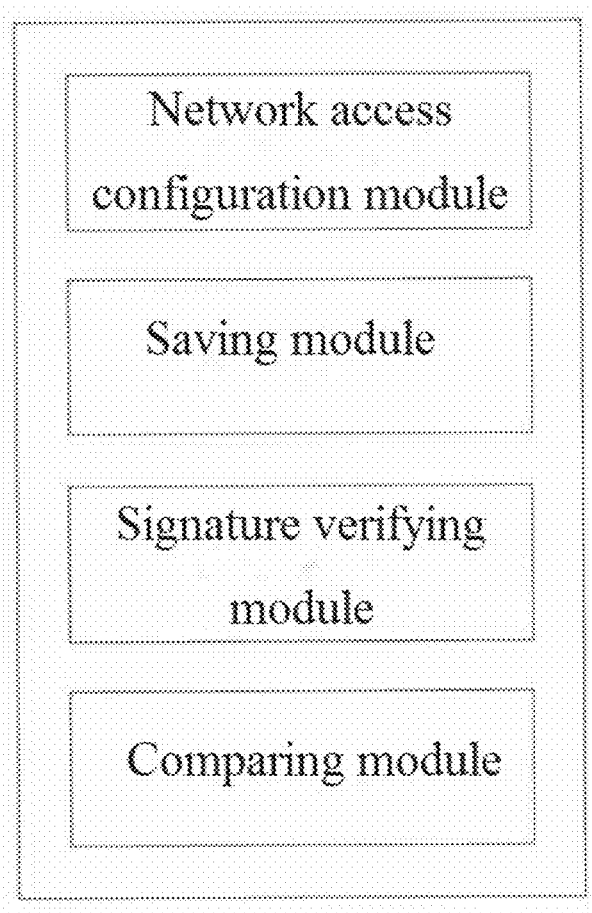
FIG. 4 is a schematic structural diagram of an IoT device according to a fourth embodiment of the present disclosure.

FIG. 4 is a schematic structural diagram of an IoT device according to a fourth embodiment of the present disclosure.

In the fourth aspect of the embodiments of the present disclosure, as shown in FIG. 4, an IoT device is provided. The IoT device mainly includes a network access configuration module, a saving module, a signature verifying module and a comparing module. The network access configuration module is configured to receive a network access configuration instruction, and to activate network access configuration in response to the network access configuration instruction. The saving module is configured to save a received public key in a process of the network access configuration. The signature verifying module is configured to verify, upon receiving a singed command and an unsigned command sent by a mobile terminal, a signature of the signed command with the public key. The comparing module is configured to compare the signature-verified command with the unsigned command, and to execute the command if the two commands are consistent.

In some embodiments, the IoT device further includes an encrypting module and a sending module. The encrypting module is configured to encrypt information to be sent with the public key, and the sending module is configured to send the encrypted information to the mobile terminal.

Encrypted transmission of information is achieved between IoT devices and application programs authorized and controlled by users. This encryption method can meet requirements of the encrypted transmission of information between the IoT devices and the application programs, and can prevent device operators, network operators, and IoT platforms from obtaining original information in the encrypted transmission.

In a fifth embodiment of the present disclosure, a storage medium is provided. On the storage medium, an application program is stored, wherein the application program, when executed by a processor, causes implementation of any one of the information transmission methods according to the first embodiment of the present disclosure.

In a sixth embodiment of the present disclosure, a storage medium is provided. On the storage medium, an application program is stored, wherein the application program, when executed by a processor, causes implementation of any one of the information transmission methods according to the second embodiment of the present disclosure.

In a seventh embodiment of the present disclosure, an electronic device is provided. The electronic device includes a memory, a processor, and a computer program stored on the memory and operable on the processor, wherein the computer program, when executed by the processor, causes implementation of any one of the information transmission methods according to the first embodiment of the present disclosure.

In an eighth embodiment of the present disclosure, an electronic device is provided. The electronic device includes a memory, a processor, and a computer program stored on the memory and operable on the processor, wherein the computer program, when executed by the processor, causes implementation of any one of the information transmission methods according to the second embodiment of the present disclosure.

The above technical solutions of the present disclosure have the following beneficial technical effects.

The application program sends the generated keys for encryption and decryption to the smart IoT device, wherein the opportunity of the initial point-to-point communication between the IoT device and the application program is utilized to send the keys to the smart IoT device. Since the key is transmitted in the process of the network access configuration of the IoT device, the transmitted key will not be received by the server, that is, the key for decrypting the ciphertext cannot be acquired at the server side. This method can meet the requirement of the encrypted transmission of information between IoT devices and user APPs, which can prevent device operators, network operators, and IoT platforms from obtaining original information in the encrypted transmission, thereby ensuring that user information will not be intercepted from the server side, and ensuring the security of user information.

The present disclosure has been described above with reference to the embodiments of the present disclosure. However, these examples are for illustrative purposes only and are not intended to limit the scope of the present disclosure. The scope of the present disclosure is defined by the appended claims and their equivalents. Various substitutions and modifications can be made by those skilled in the art without departing from the scope of the present disclosure, and these substitutions and modifications should all fall within the scope of the present disclosure.

What is claimed is:

1. An information transmission method, applied to a mobile terminal and comprising:
   sending a public key to a smart device in a process of network access configuration of the smart device, and saving a private key, wherein the public key and the private key are a pair of asymmetric keys and are generated in advance by the mobile terminal;
   obtaining a signed command by signing an unsigned command with the private key,
   and sending the signed command and the unsigned command to the smart device; and
   upon receiving encrypted information sent from the smart device, decrypting the encrypted information with the public key,
   wherein, the network access configuration is performed in a stage of an initial point-to-point communication between the smart device and an application program of the mobile terminal, and the public key and the private key are transmitted in the stage without being obtained by a server side.

2. The information transmission method according to claim 1, further comprising:
   generating first information based on authenticated login verification information;
   obtaining a first ciphertext by encrypting the private key with the first information; and
   sending the first ciphertext to a server for saving.

3. The information transmission method according to claim 2, wherein
   the login verification information comprises login password information input by a user, and generating first information based on authenticated login verification information specifically comprises:
   verifying the login password information input by the user; and
   generating the first information by a hash calculation on the login password information if the verifying is successful.

4. The information transmission method according to claim 2, further comprising:
   regenerating the first information based on the received authenticated login verification information;
   requesting the server for acquiring the first ciphertext, and obtaining the private key by decrypting the first ciphertext with the first information; and
   saving the private key.

5. The information transmission method according to claim 2, further comprising:

upon receiving an instruction for resetting the login verification information, generating second information based on reset authenticated login verification information;

obtaining a second ciphertext by encrypting the private key with the second information; and sending the second ciphertext to the server for saving instead of the first ciphertext.

6. The information transmission method according to claim 2, further comprising:

upon receiving an instruction for resetting the login verification information, generating second information based on reset authenticated login verification information;

requesting the server for acquiring the first ciphertext;

generating the first information based on the authenticated login verification information before the resetting;

obtaining the private key by decrypting the first ciphertext with the regenerated first information;

generating second information based on the reset authenticated login verification information;

obtaining a second ciphertext by encrypting the private key, obtained by decrypting the first ciphertext, with the second information; and sending the second ciphertext to the server for saving instead of the first ciphertext.

7. An information transmission method, applied to a smart device and comprising:

activating network access configuration upon receiving a network access configuration instruction;

saving a public key in a process of the network access configuration;

upon receiving a singed command and an unsigned command sent by a mobile terminal, obtaining a signature-verified command by verifying a signature of the signed command with the public key; and comparing the signature-verified command with the unsigned command, and executing the unsigned command if the two commands are consistent;

wherein, the network access configuration is performed in a stage of an initial point-to-point communication between the smart device and an application program of the mobile terminal, and the public key and the private key are transmitted in the stage without being obtained by a server side.

8. The information transmission method according to claim 7, further comprising:

encrypting information to be sent with the public key, and sending the encrypted information to the mobile terminal.

9. A non-transitory computer-readable storage medium, on which an application program is stored, wherein the application program, when executed by a processor, causes implementation of the information transmission method according to claim 1.

10. A non-transitory computer-readable storage medium, on which an application program is stored, wherein the application program, when executed by a processor, causes implementation of the information transmission method according to claim 7.

11. A mobile terminal, comprising:

a memory, configured to store a computer program; and a processor, through executing the computer program, configured to:

send a public key to a smart device in a process of network access configuration of the smart device, and save a private key, wherein the public key and the private key are a pair of asymmetric keys and are generated in advance by the mobile terminal;

obtain a signed command by signing an unsigned command with the private key, and send the signed command and the unsigned command to the smart device; and decrypt, upon receiving encrypted information sent from the smart device, the encrypted information with the public key;

wherein, the network access configuration is performed in a stage of an initial point-to-point communication between the smart device and an application program of the mobile terminal, and the public key and the private key are transmitted in the stage without being obtained by a server side.

12. The mobile terminal according to claim 11, wherein the processor is further configured to:

generate first information based on authenticated login verification information;

obtain a first ciphertext by encrypting the private key with the first information; and send the first ciphertext to a server for saving.

13. The mobile terminal according to claim 12, wherein the login verification information comprises login password information input by a user, and the processor is further configured to:

verify the login password information input by the user; and generate the first information by a hash calculation on the login password information if the verifying is successful.

14. The mobile terminal according to claim 12, wherein the processor is further configured to:

regenerate the first information based on the received authenticated login verification information;

request the server for acquiring the first ciphertext, and obtain the private key by decrypting the first ciphertext with the first information; and save the private key.

15. The mobile terminal according to claim 12, wherein the processor is further configured to:

generate, upon receiving an instruction for resetting the login verification information, second information based on reset authenticated login verification information;

obtain a second ciphertext by encrypting the private key with the second information; and send the second ciphertext to the server for saving instead of the first ciphertext.

16. The mobile terminal according to claim 12, wherein the processor is further configured to:

generate, upon receiving an instruction for resetting the login verification information, second information based on reset authenticated login verification information;

request the server for acquiring the first ciphertext;

generate the first information based on the authenticated login verification information before the resetting;

obtain the private key by decrypting the first ciphertext with the regenerated first information;

generate second information based on the reset authenticated login verification information;

obtain a second ciphertext by encrypting the private key, obtained by decrypting the first ciphertext, with the second information; and send the second ciphertext to the server for saving instead of the first ciphertext.

17. A smart device, comprising:
a memory, configured to store a computer program; and
a processor, through executing the computer program, configured to implement the information transmission method according to claim 7.

18. The smart device according to claim 17, wherein the processor is further configured to: encrypt information to be sent with the public key, and send the encrypted information to the mobile terminal.

\* \* \* \* \*